United States Patent [19]
Leeb

[11] Patent Number: 5,964,080
[45] Date of Patent: *Oct. 12, 1999

[54] HARVESTING MACHINE

[75] Inventor: Georg Leeb, Zweibrucken, Germany

[73] Assignee: Deere & Company, Moline, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/788,878

[22] Filed: Jan. 22, 1997

[30] Foreign Application Priority Data

Jan. 31, 1996 [DE] Germany .............................. 196 03 370

[51] Int. Cl.⁶ ..................................................... A01D 34/00
[52] U.S. Cl. .............................. 56/14.3; 56/14.4; 56/14.5; 56/14.7; 56/16.6; 56/17.1; 56/156; 56/167; 56/249
[58] Field of Search ..................................... 56/14.3, 14.4, 56/14.5, 14.7, 16.6, 17.1, 17.5, 156, 167, 249, 304

[56] References Cited

U.S. PATENT DOCUMENTS 1,558,394  10/1925  Rice ........................................... 56/504
5,189,868  3/1993  Hill ............................................ 56/13.3

FOREIGN PATENT DOCUMENTS

| | | |
|---|---|---|
| 0242718 | 10/1987 | European Pat. Off. . |
| 0510470 | 10/1992 | European Pat. Off. . |
| 2598059 | 11/1987 | France . |
| 2692430 | 12/1993 | France . |
| 9002780 | 6/1990 | Germany . |
| 930920 | 7/1995 | Germany . |
| 1014197 | 12/1965 | United Kingdom . |
| 2012540 | 8/1979 | United Kingdom . |

OTHER PUBLICATIONS

Advertising Brochure (Aug. 1995 (M+E)dt. 150/190.432.7) of Claas Company relating to its Models 880, 860, 840, and 820 Jaguar.

*Primary Examiner*—J. Woodrow Eldred

[57] ABSTRACT

An ensilage harvester is equipped with a blower including a rotor equipped with paddles for conveying crop along a housing wall surrounding the rotor. The paddles include cutting edges that reach close to the wall so as to cut crop that may enter the rotor between a paddle and the wall as the paddle is approaching the wall with the result that the crop captured between the wall and the cutting edges is cut thereby preventing crop from becoming jammed in the intervening gap and causing friction losses.

3 Claims, 3 Drawing Sheets

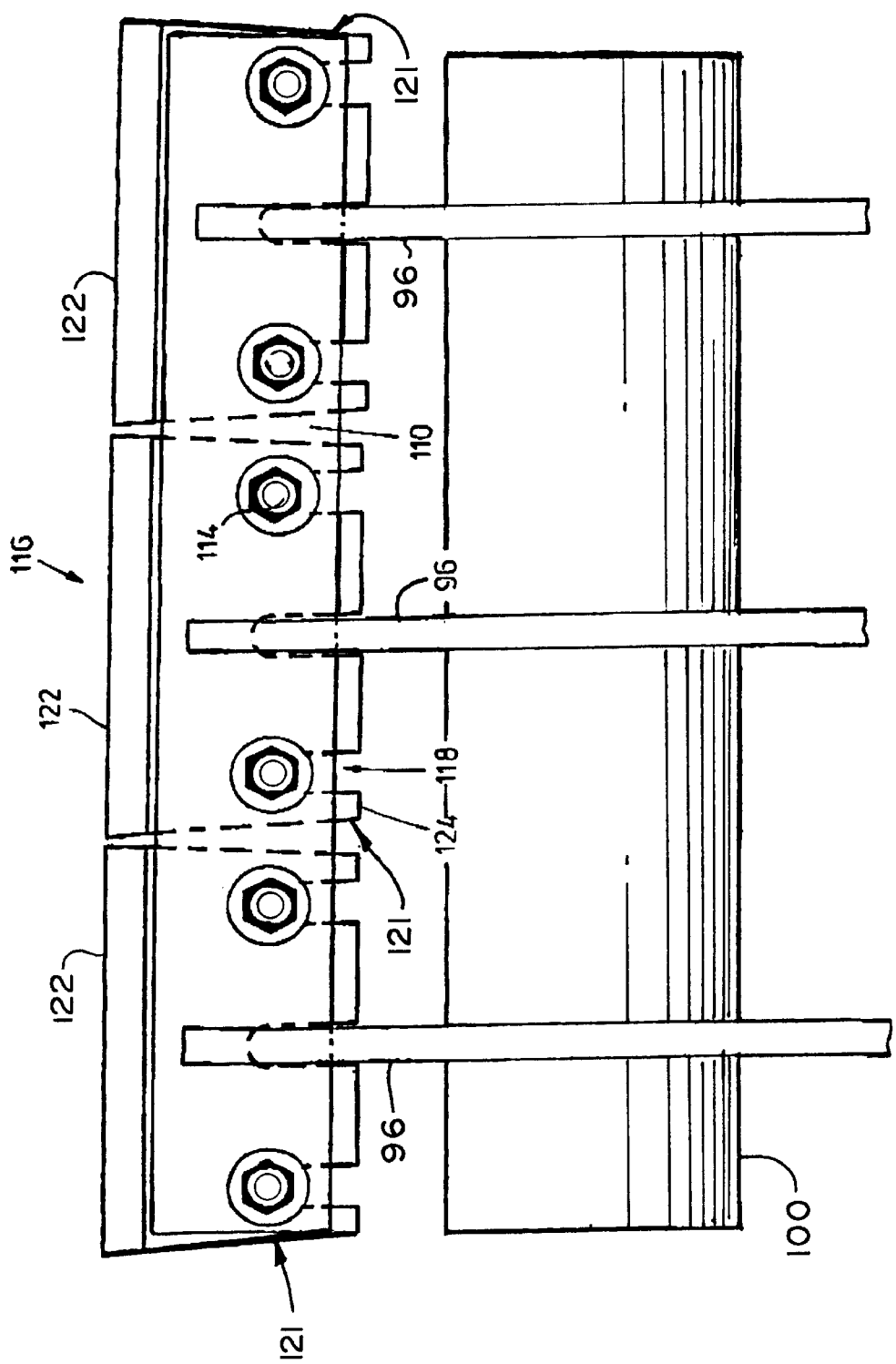

HARVESTING MACHINE

BACKGROUND OF THE INVENTION

The present invention concerns a harvesting machine, in particular a forage harvester, with a blower equipped with paddles for the conveying of crop along a wall.

The advertising brochure (8/95(M+E) dt. 150/190.432.7) of CLAAS Company relating to its Models 880, 860, 840 and 820 JAGUAR forage harvesters discloses a chopper assembly containing a chopper drum, that chops crop such as corn, grass, sorghum or the like and conveys it to a delivery duct from where it flows to a companion vehicle. The delivery duct contains a blower that accelerates the crop. This blower contains a rotor with three circular disks that are connected to each other by rails. Paddles are screwed to the rails that are oriented at an angle to the axis of rotation of the rotor, the end region of the paddles is provided with teeth or a serrated edge.

This known blower is not entirely satisfactory since paddles of this type require a costly manufacturing process and the inclined arrangement leads to increased fabrication costs.

SUMMARY OF THE INVENTION

According to the present invention, there is provided a forage harvester blower having paddles constructed in such a way as to overcome the above noted drawbacks of the prior art blower.

It is a broad object of the invention to provide a chopped crop conveying blower constructed so as to increase the efficiency of the operation of the blower.

A more specific object of the invention is to provide a chopped crop conveying blower as described in the foregoing object which employs crop conveying paddles provided with radially outer sharpened cutting edges that can cut crop located between them and the wall of the blower housing and thereby prevent friction that could lead to high power requirements, to wear and to high peak loads.

Yet a more specific object of the invention is to provide a blower as described in the immediately preceding object wherein the paddles are also bent in the direction of rotation in the region of the cutting edge, thereby forming a pocket that restrains the material from pressing itself too firmly against the wall so as to further reduce the frictional resistance to crop movement.

Still another object of the invention is to provide crop conveying paddles of a blower with radially outer sharpened edges and to mount the paddles for radial adjustment so as to provide a very-small gap between sharpened edges and the blower housing wall so that the edges will efficiently cut crop tending to be trapped between the cutting edges and the housing wall.

A further specific object of the invention is to provide a blower having crop conveying paddles constructed of a plurality of segments which are similar enough to the cutting knives of the chopper of the ensilage harvester embodying the blower that the paddle segments may be substituted for the cutting knives and sharpened by the cutter knife sharpener with which the ensilage harvester is normally equipped.

These and other objects will become apparent from a reading of the ensuing description together with the appended drawings.

BRIEF DESCRIPTION OF THE DRAWINGS

FIG. 3 shows a section of the blower as viewed in the direction of rotation.

DESCRIPTION OF THE PREFERRED EMBODIMENT

Figure 1:
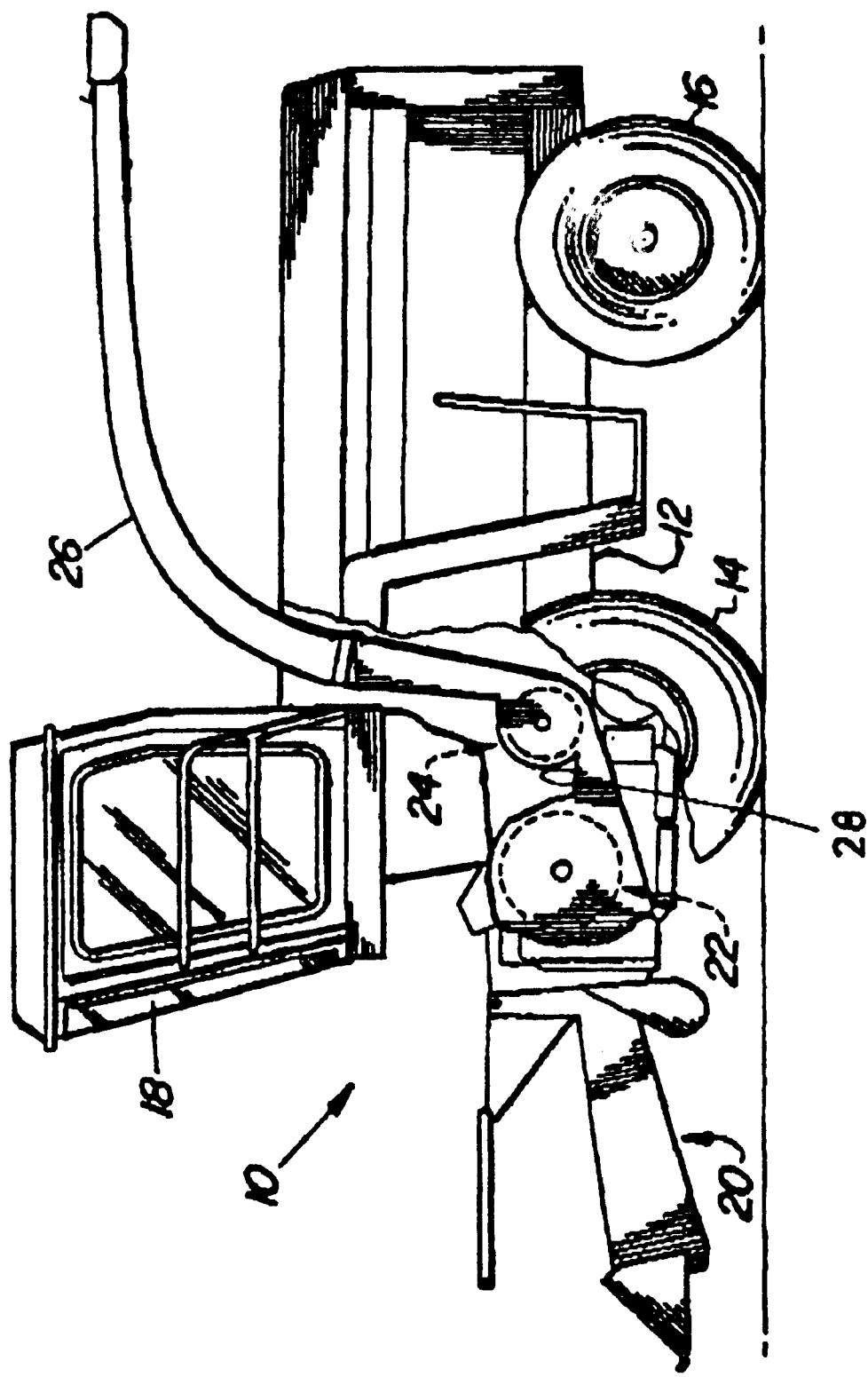
FIG. 1 shows a schematic side view of a harvesting machine with a blower.

A harvesting machine 10 in the form of self-propelled forage harvester, shown in FIG. 1, is built upon a frame 12 that is supported on front and rear wheels 14 and 16. The harvesting machine 10 is operated from an operator's cab 18 from where a crop take-up arrangement 20 can be observed visually. Crop, for example corn, grass or the like, picked up from the ground by the take-up arrangement 20 is conducted to a chopper assembly 22 that contains a chopper drum, not described in greater detail, equipped with knives and an opposing cutter bar, which chops the crop into small pieces and delivers it to a conveyor configured as a blower 24. The crop leaves the harvesting machine 10 to reach a trailer traveling alongside through a pivoted delivery arrangement with a delivery duct 26. Further details of the harvesting machine 10 do not need any description as this is known in itself.

Figure 2:
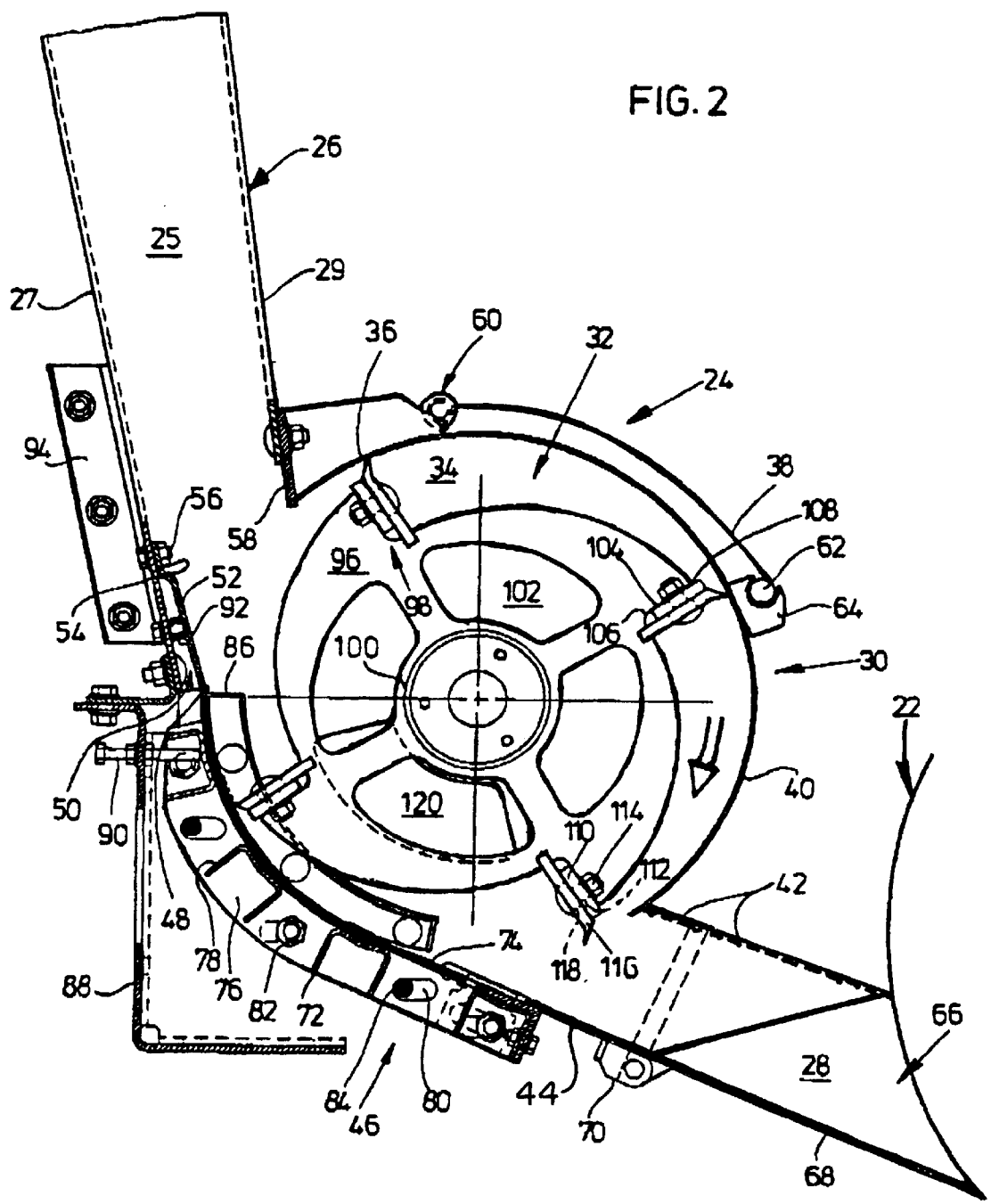
FIG. 2 shows an enlarged side view of the blower with the right side wall removed.

According to FIG. 2, the blower 24 is arranged between an intake duct 28 and the delivery duct 26 and contains, in particular, a housing 30 and a rotor 32.

The housing 30 is composed of two side walls 34, of which only the left side wall 34, as seen in the normal direction of travel, can be seen; nevertheless, the right side wall is configured similarly to the left side wall 34. In an upper region between the side walls 34, starting from the downstream wall 29 of the delivery duct 26 there extends a rigidly arranged first enclosure piece 36, followed by an adjacent lid 38 and, following this, a second enclosure piece 40 which is adjacent to a cover 42 of the intake duct 28. The inner surface of the enclosure pieces 36, 40 and of the lid 38 lie on a circular arc that is at a small spacing from the rotor 32 and is concentric to it. A housing section 46 follows a bottom 44 of the intake duct 28 over an arc of approximately 90° to 100° and its inner surface also generally follows the aforementioned circular arc. The upper edge 48 of the housing section 46 ends in the immediate vicinity of the upstream wall 27 of the delivery duct 26, but forms a gap 50 with it. Finally, a guide vane 52 extends between the edge 48 and the upstream wall 27 and has an upper portion 54 fastened to the wall with screws 56. Accordingly the crop brought through the intake duct 28 from the right in the drawing is conducted over the bottom 44, the housing section 46, the guide vane 52 and the upstream wall 27 from where it switches to the downstream wall 29.

The first enclosure piece 36 is connected through a rail 58 to the downstream wall 29 and carries at its opposite edge a part of a joint 60. One end of the lid 38 engages the other part of the joint 60 and is thereby connected to the first enclosure piece 36 so as to pivot vertically. In an upper position, not shown in the drawing, the lid 38 provides access to the rotor 32 for maintenance purposes. At its end opposite the joint 60, the lid 38 carries a rod 62 which is shown engaged with a hook 64 that is rigidly connected to the second enclosure piece 40 and which can be secured there by means of screws, pins or the like. In this way the lid 38 is prevented from opening by itself during operation. The second enclosure piece 40 covers the section between the lid 38 and the cover 42 of the intake duct 28. The cover 42 and the bottom 44 of the intake duct 28 are adjacent to a section 66 that extends up to the housing surrounding the chopper drum 22 and exhibits generally the same passage area as the intake duct 28. This section 66 can be completely disassembled and replaced by another section whose interior contains a kernel processing unit. Beyond that, the section 66 includes a lower wall portion 68 having a left end, as seen in FIG. 2, which is joined to the bottom 44 by a further joint 70 so that it can pivot downward after releasing latches, not shown.

To the rear, that is to the left in FIG. 2, the bottom 44 is adjacent to and followed by the housing section 46 which is composed largely of a frame 72 and a wall 74 formed of sheet metal. The frame 72 is composed of transversely spaced cheeks 76 joined by transverse, parallel ribs 78 that have a U-shaped cross section and ends welded to the cheeks. Webs of the ribs 78 are arcuately formed to conform to the circumferential surface of the rotor 32, but maintain a minimum possible gap. Several openings 80, similar to elongated holes, are provided in the cheeks 76 through which screws 82 and spacers 84, in the form of rods with circular cross section, extend. The screws 82 as well as the spacers 84 are inserted into holes in the side walls 34 which fix the screws and spacers in place. The screws 82 are used to secure the frame 72 in the proper position to the side walls 34, while the spacers 84 are required to retain the side walls 34 at all times at the same spacing to each other so that the frame 72 as well as the wall 74 can be moved between the side walls 34 for maintenance purposes.

Guides 86 are attached to the side walls 34 concentric to and on the opposite side of the wall 74 from the cheeks 76, the guides thus being spaced from the radially inner surfaces of the cheeks 76 a distance that corresponds to the thickness of the wall 74. The guides 86 are formed from bent steel angles, one of whose legs is attached with screws to the side walls 34, while the other leg is spaced at a small distance inwardly from the side walls 34. In lieu of steel angles, the guides 86 could be formed from an appropriately bent, flat steel strip.

The wall 74 is formed from a material which may be provided with a surface treatment that assures a high strength and therewith a long wear life. Depending on the thickness of the wall 74, it may be bent to a contour corresponding to the circle swept by the rotor 32 or it may be applied as a piece of flat sheet metal to the frame 72 when this is pivoted or slid away from the rotor 32. In any case the wall 74 is brought into the correct shape between the frame 72 and the guides 86 by sliding the frame 72 on the spacers 84 or pivoting it about a joint that may be provided toward the rotor 32 and retained there by friction locking. Beyond that it can be retained at its upper edge 48 against the guide vane 52 and at its lower edge against the bottom 44 so that it can be held secure against loss. In the upper region of the frame 72, an adjustment screw 90 is provided that is held in a carrier 88, the screw 90 permitting a precise adjustment of the frame 72 and the wall 74 with respect to the rotor 32.

The guide vane 52 extends over the entire width of the upstream wall 27 and is retained in its precise spacing by its upper portion 54 as well as by means of spacer sleeves 92 whose thickness may be variable if desired. Only the upper portions 54 of the guide vane 52 are bent towards the wall 27 and these take up a small part of the width of the guide vane 52. In this way the gap 50 is maintained over the entire vertical extent of the guide vane 52, and air can be drawn into the interior of the delivery duct 26 from the outside of the housing 30 through the gap 50.

As can be clearly seen in FIG. 2, the surface of the guide vane 52 facing the rotor 32, which generally guides only air, is not located on the tangential surface of the housing section 46 in the region of its output trajectory, but diverges from it. The crop thrown off from the rotor 32 is therefore given a direction towards the wall 29 along which it continues until it leaves the delivery duct 26 and thus does not break up into a diffuse flow of material.

The rail 58 extends almost up to the enveloping circle of the rotor 32 and forms an edge there to strip or separate the cylinder of air moving with the rotor 32.

Furthermore it can be seen from FIG. 2 that the delivery duct 26 is fastened with its upstream wall 27 to a mount 94 and is retained there if the housing 30 is to be removed for maintenance purposes.

The rotor 32 is composed largely of carrier elements 96, conveyor assemblies 98 and a shaft 100, that extend between the side walls 34 and that rotate together about an axis of rotation. In this embodiment, three carrier elements 96 are welded to the shaft 100, spaced axially and directed radially. The carrier elements 96 are configured as disks, but in each 90° sector they contain a kidney-shaped opening 102 which occupies a considerable portion of the area of each sector. Furthermore, the remaining portion of the carrier element 96 does not end in a circular arc, but is provided with radial ribs 104, that have inner and outer ends 106 and 108, respectively, spaced apart a distance equal to approximately one-fifth of the radius measured to the outer end 108. The outer edge of the carrier element 96 is curved between the inner and outer ends 106 and 108 respectively of adjacent ribs 104, as considered in the clockwise direction in FIG. 2, such that the radius of the curved outer edge increases in the counterclockwise direction between adjacent ribs 104.

In the embodiment shown, four conveyor assemblies 98 are provided. Specifically, each assembly 98 includes a paddle carrier 110, in the form of a rectangular plate, that extends transversely over the entire width of the rotor 32 and is positioned flat against and welded to each of the ribs 104, thereby interconnecting all of the carrier elements 96. All in all, the carrier elements 96 are welded on the one hand to the shaft 100 and on the other hand to the paddle carriers 110 and thereby form a robust rotating body with an open design. The paddle carriers 110 are provided with holes 112 for screws 114. Other designs are also possible in which the paddle carriers 110 do not extend over the entire width of the rotor 32, but only over a partial region that is associated with a conveyor assembly 98. In addition to the paddle carriers 110, the conveyor assemblies 98 also include paddles 116 that are attached to the carriers by means of the screws 114. For this purpose, the paddles 116 are provided with slots 118 open at one end, that permit a radial adjustment of the paddles 116 with respect to the housing 30. The paddles 116 could also be attached directly to the carrier elements 96, that is, without the use of a paddle carrier 110. The shaft 100 extends through appropriate openings in the side walls 34 in corresponding bearing arrangements and can be driven at high rotational speed by means of a belt pulley, not shown.

In the side walls 34 an opening 120 is also provided which can be in alignment with one of the openings 102 in the carrier elements 96, depending on the position of the rotor 32. However the cross sectional area of the openings 120 is somewhat larger than that of the openings 102. In this embodiment the openings 120 are each located in or generally in the first quadrant of the housing 30, that is a 90° sector, downstream of the intake duct 28. Although not shown, it is also possible to provide a sheet metal door, or the like, mounted on the outside of each of the side walls 34, for movement across the adjacent opening 120 for the purpose of reducing or relocating the effective cross sectional area of the associated opening 120. Such an adjustment could be made manually, if desired, from the operator's cab 18 or automatically in response to certain conditions.

After all that it can be seen that the rotor 32 turning in the direction of the arrow can draw supplementary air to the crop, from the intake duct 28 through the openings 120 and then through the carrier element openings 102, which enriches the flow volume and assures a faultless delivery of the crop to the delivery duct 26 as well as a compact material flow within the delivery duct 26. In addition, any blowback of air into the intake duct 28 is avoided which could impair the intake of crop. Instead suction is developed that combines with the conveying pressure in the delivery duct 28 to provide balanced flow conditions.

In this embodiment the paddles 116, as can best be seen in FIG. 3, are formed by a plurality of paddle segments 121 similar to the knives used on a chopper drum of the chopper assembly 22 to chop the crop. Thus, each paddle segment 121 has a generally trapezoidal configuration where the longest side of the paddle 116 ends in a cutting edge 122. In the region opposite the cutting edge 122 the open slots 118 extend to an edge 124 and are perpendicular to the cutting edge 122. These paddle segments 121 may be planar, according to the chopper knives disclosed in U.S. Pat. No. 4,061,284, granted Dec. 6, 1977, or slightly twisted in the region of the cutting edge, like the chopper knives disclosed in U.S. Pat. No. 5,544,826, granted Aug. 13, 1996, or bent slightly in the region of the cutting edge like the chopper knives disclosed in U.S. Pat. No. 4,257,566, granted Mar. 24, 1981. It is significant that the paddle segments may generally correspond to any one of the chopper knives described since it is then possible in a harvester so equipped to replace the cutter knives with the paddle segments in order to use the sharpening system normally provided for sharpening the cutter knives to sharpen the cutting edges 122 of the paddle segments 121. Of course, such a sharpening mechanism could be mounted in association with the blower 24, but this would be at an additional expense.

In any event, each paddle segment 121 is provided over its entire width with three slots 118 where, according to FIG. 3, the outer slots 118 are used to accommodate the screws 114, if necessary with washers, so as to make possible a radial adjustment, the outer position of which is determined by the position of the rail 58. In this embodiment, the central slot 118 is not used for fastening, but provides clearance for, and thus overlaps both sides of, the carrier element 96. Accordingly, each paddle 116 can extend far towards the center of the rotor 32. Hence, the central slot 118 permits a centered arrangement of the paddles, with respect to the associated carrier element 96, as well as the application of a paddle 116 with a relatively large surface area that provides an outstanding conveying of the crop. In the region of their cutting edges 122, each paddle segment 121 is bent slightly ahead in the direction of flow with respect to the remainder of the paddle 116 and thereby form a pocket that restrains material from pressing itself too firmly against, and keeps the material in a straight-line movement with respect to, the surface of the wall 74, whereby the frictional resistance is further reduced.

The three segments 121 of each paddle 116 are here shown applied alongside each other to the paddle carrier 110. However, the paddle segments 121 of each paddle 116 may be arranged in such a way that they are offset from each other in the tangential direction. For this purpose, the paddle carrier 110 would be divided into three segments configured as wide as the paddle segments 121 instead of extending over the entire width of the blower 24 with the carrier elements 96 being arranged either with the center carrier element indexed slightly ahead or behind the end carrier elements 96, in which case the middle paddle segment 121 would either lead or trail the end paddle segments 121, or with the carrier elements 96, as considered from one end to the other of the rotor 32, being indexed relative to each other whereby the middle paddle segment 121 leads one end paddle segment, while the other end paddle segment leads the middle paddle segment. This could avoid an irregular flow of the crop conveyed with large accumulations which could lead to peaks in the power requirement. In all embodiments, the cutting edges 122 of the paddle segments 121 end on the same circumferential line.

While three paddle segments 121 are here shown are arranged alongside each other and thereby cover the width of the rotor 32, more paddle segments 121 could be provided, but rarely fewer. It is not necessary that the side edges of adjacent paddle segments 121, across the width of the rotor 32, be located on a circular plane, instead the paddle segments 121 may overlap slightly in the axial direction or they may be spaced at a small distance from each other.

Preferably, the paddle segments 121 are rigidly mounted, as opposed to being pivotally mounted, so that a fixed relationship exists between the cutting edges 122 and the wall 74. However, the concept of providing paddle segments with cutting edges would have utility even if swingably suspended providing that the weight of the paddle segments was relatively heavy and that the segments were operated at a relatively high peripheral speed, which results in high centrifugal forces that lead to a condition close to that of a rigid attachment.

Furthermore, instead of the selection of the illustrated embodiment, more or fewer than four paddles carriers 110 could be used, where a selection of eight paddles carriers 110 is very effective and still represents a good balance with manufacturing costs. Similarly the carrier elements 96 could be configured differently, since the principal concern here is the configuration of the paddles 116 with a cutting edge 122.

According to a further design variation, the paddles 116 may be oriented in such a way that the radially inner ends of the paddles 116 leads their radially outer ends. Thus, the plane of the paddles 116, as considered radially, diverges slightly from an intersecting radial plane of the rotor 32. The angle of divergence could lie between 5° and 15°, with 10° being preferred.

The operation of the blower 24 is thought to be understood. Suffice it to say that the paddle cutting edges 122 serve to sever crop located between radially outer ends of the paddles 116 and the housing wall portion 74, this severing resulting in minimizing the frictional drag between the crop and the housing as would otherwise occur due to crop becoming wedged between the paddles 116 and the housing wall portion 74. Additionally, the fact that the paddle segments 121 are constructed similarly to the cutting blades of the chopper assembly 22 makes it possible to mount the segments 121 on the chopper assembly cutter drum or spider assembly, in place of the cutting blades, in order for the paddle segments to be sharpened by the sharpening system normally associated with the chopper assembly.

I claim:

1. In a forage harvester having a blower assembly including a rotor located within a housing having a smooth, cylindrical wall, said rotor being equipped with a plurality of paddles spaced angularly about a rotational axis of the rotor for conveying crop along said wall of said housing, the improvement comprising: said paddles each being oriented substantially radially and being beveled radially outwardly to define a straight cutting edge disposed in its entirety in close proximity to said smooth wall of said housing, whereby the cutting edges of said paddles act to sever crop pinched between said cutting edges and said wall in order to lessen the frictional resistance to crop moving through said housing.

2. The forage harvester defined in claim 1 wherein said paddles are each bent forward in the direction of rotation in the region of its cutting edge.

3. The forage harvester defined in claim 1 wherein said rotor includes a plurality of radially extending mounting surfaces for said paddles; said paddles being provided with radially extending mounting slots at said mounting surfaces for receiving mounting bolts, whereby a radial adjustment may be effected; said rotor further including a shaft having a plurality of relatively narrow, carrier elements fixed thereto at axially spaced locations therealong; said mounting slots being spaced axially to opposite sides of said carrier elements; and said paddles overlapping said carrier elements and containing respective clearance slots receiving said carrier elements.

\* \* \* \* \*